United States Patent
Hartmann

[19]

[11] Patent Number: 5,931,619
[45] Date of Patent: Aug. 3, 1999

[54] EXPANSION DOWEL

[75] Inventor: Markus Hartmann, Mauerstetten, Germany

[73] Assignee: Hilti Aktiengesellschaft, Schaan, Liechtenstein

[21] Appl. No.: 08/687,279

[22] Filed: Jul. 25, 1996

[30] Foreign Application Priority Data

Aug. 5, 1995 [DE] Germany .......................... 195 28 808

[51] Int. Cl.$^6$ .................................................. F16B 13/06
[52] U.S. Cl. .................................. 411/60; 411/54; 411/57
[58] Field of Search ................................. 411/60, 61, 62, 411/63, 64, 65, 66, 57, 44, 446, 448, 54

[56] References Cited

U.S. PATENT DOCUMENTS

| | | | |
|---|---|---|---|
| 3,022,701 | 2/1962 | Potruch | 411/57 |
| 3,843,302 | 10/1974 | Petzetakis | 425/388 |
| 3,848,506 | 11/1974 | Zifferer | 411/17 |
| 3,921,496 | 11/1975 | Helderman | 411/60 |
| 4,634,326 | 1/1987 | Fischer | 411/61 |
| 4,673,321 | 6/1987 | Herb et al. | 411/40 |
| 4,898,505 | 2/1990 | Froehlich | 411/57 |
| 4,919,579 | 4/1990 | Miyanaga | 411/60 |

FOREIGN PATENT DOCUMENTS

| | | |
|---|---|---|
| 0216233 | 8/1986 | European Pat. Off. . |
| 2006590 | 4/1969 | France ..................... 411/72 |
| 5054 | 4/1885 | United Kingdom ..................... 411/60 |
| 0565003 | 10/1944 | United Kingdom . |
| 2151739 | 11/1984 | United Kingdom . |
| 2224550 | 8/1988 | United Kingdom . |
| 9006446 | 11/1989 | WIPO . |

*Primary Examiner*—Brian K. Green
*Assistant Examiner*—Robert G. Santos
*Attorney, Agent, or Firm*—Anderson, Kill & Olick, P.C.

[57] ABSTRACT

An expansion dowel is formed of an axially extending expansion sleeve (2) with a through bore (9) and an expansion region (3) having at least one axially extending slot (5), and an expanding member (6) axially displaceable by axially directed blows in the through bore from an initial position to an end position in which the expansion region (3) is expanded. The through bore (9) has an inside surface (4) of the expansion region (3) adjacent to an envelope or outside surface (7) of the expanding member (6) in the end position with the radius of curvature (a) of the inside surface (4) basically the same as the radii of curvature of the envelope surface (7) of expanding member (6).

7 Claims, 1 Drawing Sheet

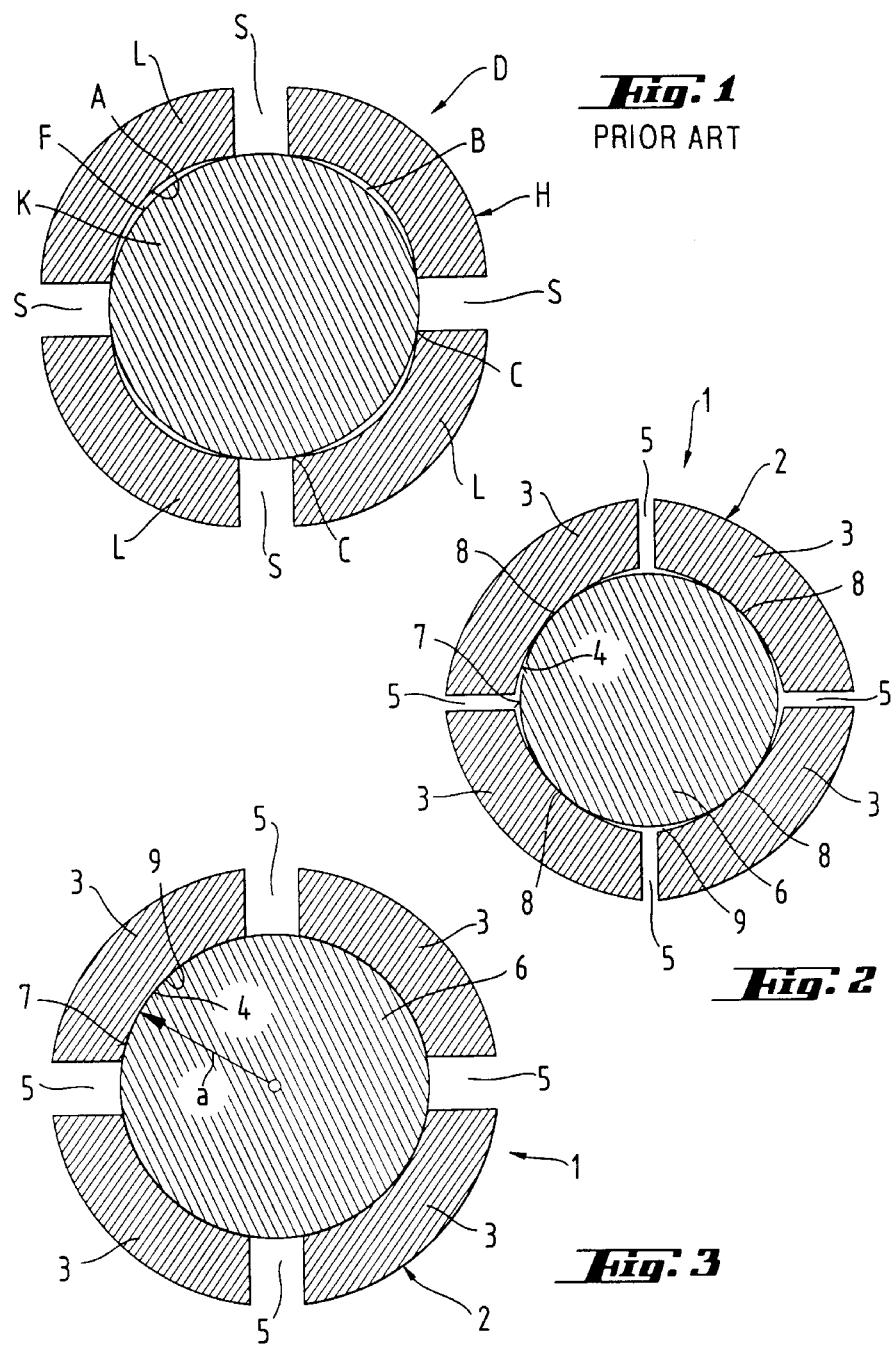

EXPANSION DOWEL

BACKGROUND OF THE INVENTION

The present invention is directed to an expansion dowel formed of an axially extending sleeve having an axially extending through bore, an axially extending expanding region with at least one axially extending slot and an expanding member axially displaceable in the through bore from an initial position to an end position.

Conventional expansion dowels comprise an expansion sleeve with a through bore and an expansion member axially displaceable in the through bore. The expansion sleeve has an expansion region provided with at least one axially extending slot, with the expansion region extending to the leading end of the expansion sleeve, that is the end inserted first. Usually the expansion region is divided into four expansion tangs separated from one another by axially extending slots. The through bore is cylindrically shaped in the portion of the expansion sleeve extending from the expansion region to a trailing end and serves as a load engagement part. The through bore can also be cylindrically shaped in the expansion region, however, often it tapers in a cone shaped manner towards the leading end of the expansion region. The expanding member is usually retained in a captive manner in an initial position in the through bore. The expanding member can be cylindrically shaped, cylindrical with an adjacent conically shaped part or spherically shaped for its axial extent.

The spreading of the expansion dowel occurs by the axial displacement of the expanding member in the through bore from its initial position into an end position. The expansion region is widened with the expansion tangs pressed outwardly against the wall of the receiving bore. Special setting tools are used in the expanding step in which the expanding member is driven into a predetermined position by axially directed blows. The axial blows are usually exerted directly on the expanding member, so that it is driven in the setting direction in the through bore while widening the expansion region. It is also possible that the expansion sleeve is driven over an expanding part projecting inwardly from its leading end.

In known expansion dowels, the through bore is rotationally symmetrical in the unexpanded state of the dowel. The radius of curvature of the expansion dowel and of the expanding member are matched to one another in a contact region in the initial position of the expanding member. The expanding member, retained captively in this manner in its initial position in the through bore, is completely embraced by the wall of the through bore and in its initial position in the contact region usually has an area-type contact with the wall of the through bore. The tangs of the expansion region are pressed outwardly due to the axial displacement of the expanding member into its end position. The through bore loses its rotationally symmetrical shape during the expanding step. Since the expanding member continues to have a rotationally symmetrical outer contour, it has essentially only a line-shaped contact in its end position in the contact region with the expansion tangs. The high expanding pressure must be transmitted over a very small contact region and locally there is developed high area pressures which lead to a slight adaptation of the radii of curvature of the expansion tangs and the expanding member in the contact region. Accordingly, additional energy must be supplied, and does not assist in the expanding operation. High frictional forces must be overcome in displacing the expanding member from its initial position into its end position, causing an increase in the required setting energy. Due to the high frictional forces, a coating applied upon the expanding member, for instance, in order to protect it from corrosion can be scraped off and thereby becomes useless. If rust free materials are used this can lead to cold welding in view of the high frictional forces generated during displacement of the expanding member. The expansion sleeve, however, is only expanded in an incomplete manner and the load attachment region cannot attain the required load carrying values or it may be necessary to completely abandon the dowel.

SUMMARY OF THE INVENTION

Therefore, it is the primary object of the present invention to provide an expansion dowel which avoids the disadvantages of the conventional expansion dowels mentioned above. In particular, an expansion dowel is to be provided which can be installed reliably. The required driving energy is to be kept low. Any coatings are to remain unaffected during the displacement of the extending member. Cold welding of rust free materials is to be avoided.

In accordance with the present invention, an expansion dowel is provided having an axially extending expansion sleeve with an axial through bore and an expansion region provided with at least one axially extending slot, and an expanding member axially displaceable in the through bore by axially directed blows from an initial position to an end position with simultaneous expansion of the expansion region. The through bore has radii of curvature in a part of its axial extent which, in the end position of the expansion member, is adjacent to the envelope surface or outside surface of the expanding member with the radii of the curvature coinciding with the radii of curvature of the envelope surface of the expanding member.

Since the radii of curvature of the through bore in the expansion sleeve and of the expanding member in its end position are the same in the contact region, a line-shaped contact between the expansion sleeve and the expanding member is avoided. An area of contact exists between the expansion sleeve and the expanding member during the displacement of the expanding member in the through bore. This results in lower specific area pressures when the expansion sleeve is widened. The frictional forces which have to be overcome are reduced and the required driving energy is lowered compared to that in the expansion dowels. Due to the lower friction possibly existing coatings are no longer damaged. The danger of cold welding rust-free materials in the course of displacing the expanding member in the through bore of the dowel is reduced. This prevents the expanding member from being insufficiently displaced and the expansion sleeve from being incompletely widened. Because of the inventive arrangement of the expansion dowel, the sleeve need scarcely be plastically deformed in the course of displacing the expanding member and accordingly, facilitates the displacement of the expanding member.

For reasons of symmetry and because of the improved expandability, it is advantageous for the expansion region to have four expansion tangs separated by axially extending slots, with internal surfaces bordering the through bore having the radii of curvature in the contact region with the expanding member displaced to its end position, which in the expanded state in axially projection form sections of a circular contour.

In one embodiment of the expansion dowel of the present invention, the radii of curvature in the expanded state of the expansion region are constant in the contact area with the expanding member. In a variation of the expansion dowel, the radii of curvature in the expanded state of the expansion region diminishes towards the leading end of the contact area with expanding member. In case of an expanding manner shaped in a spherical member, the radii of curvature in the expansion region in the contact area are matched to the spherical surface of the expanding member in its end position.

The arrangement of the radii of curvature of the through bore is selected in such a way that the surfaces of the through bore form, with the envelope surface or outside surface of the expanding member in its initial position, axially extending basically line shaped contact regions. In this manner, the expanding member is held captively in the through bore. The forces acting upon the expanding member in the contact region are small in the unexpanded state of the expansion sleeve. Therefore, the expanding member can be displaced relatively easily if it is necessary to do so. In the course of the displacement, the axial line contact changes over into an area of contact so that the area pressures developed during expansion and the frictional forces are kept low.

In another preferred embodiment of the present invention, the line shaped contact regions are disposed with the radii of curvature matched to the envelope surface of the expanding member upstream in the setting direction from the expansion region. In such an expansion dowel, the expanding member is driven forwardly in the through bore by means of axial blows directed toward the base of the bore hole in which the dowel is placed, until it has reached its end position. The expansion dowel can be expanded independently of the depth of the receiving bore. A suitably designed setting tool defines the exact end position of the expanding member in the through bore.

In still another preferred embodiment of the present invention, the adaptation of the radii of the expansion region adjacent to the envelope surface of the expanding member in the initial position is effected by calibrating the through bore, preferably with a hardened die. The calibration by a hardened die is a fast and easy operation to perform and permits an economic fabrication of the expansion dowel in accordance with the present invention.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is a cross sectional view of a conventional expansion dowel with an expanding member located in its position extending perpendicularly to the dowel axis;

FIG. 2 is a cross section of an expansion dowel embodying the present invention with the expanding member in its initial position perpendicularly to the dowel axis; and FIG. 3 is a cross sectional view perpendicularly to the dowel axis similar to FIG. 2 with the expanding member in its end position.

DETAILED DESCRIPTION OF THE INVENTION

FIG. 1 illustrates in cross-section an expansion dowel of a conventional type. Such an expansion dowel is disclosed in European Patent EP-B-0,216,233. The expansion dowel D has an axially extending expansion sleeve H with an axially extending through bore B tapering in a conical manner in the setting direction, and an expansion region. In the illustrated embodiment, the expansion region is formed by four axially extending tangs L separated by axially extending slots S. An expanding member K is held in the through bore B and is displaceable from an initial position into an end position while it spreads the expansion tangs. In FIG. 1 the section extends perpendicularly to the dowel axis and passes through the contact region of the expanding member K in its end position and the inside surface A of the expansion tangs L. It can be seen clearly from FIG. 1 that the inside surface A of the expansion tangs L have a different radius of curvature than the envelope or outside surface F of the expanding member K. This is because the radius of curvature of the through bore B is adapted to the expanding member K in its initial position. In the course of the expansion of the tangs L, the through bore B loses its rotationally symmetrical shape. There is no area contact achieved with the contact region of the through bore B between the inside surface A of the tangs L and the envelope surface F of the expanding member, rather each of the expansion tangs L contacts the envelop surface F of the expanding member K only along two axially extending straight lines C.

The high expanding pressure must be transmitted through very small contact regions C which results in very high area pressures locally and causes a slight adaptation of the radii of curvature of the tangs L and the expanding member K in the contact region C. Additional energy required must be supplied and does not assist in the expansion. In the course of displacement of the expanding member K from its initial position into its end position, high frictional forces have to be overcome which increases the required driving energy. Because of the high frictional forces a coating possibly applied to the expanding member K, for instance, to protect the expanding member K from corrosion, can be scraped off and thus rendered useless. With rust-free materials, cold welding can occur because of the high frictional forces developed during displacement of the expanding member K. The expansion sleeve H is, as a result, only incompletely expanded and the attachment region cannot attain the required load carrying value or the use of the dowel must be completely abandoned.

In FIGS. 2 and 3 an embodiment is displayed of an expansion dowel in accordance with the present invention. The expansion dowel 1 includes an axially extending expansion sleeve 2 with an axially extending through bore 9 as well as an expansion region. The expansion region is formed by four axially extending expansion tangs 3 separated by axially extending slots 5. An expansion member 6 is displaceable by axially directed blows in the through bore 9 in the axial direction from an initial position as shown in FIG. 2 into an end position as shown in FIG. 3. As the expanding member 6 is displaced axially, the expansion sleeve is widened, that is, the expansion tangs 6 are pressed outwardly against the borehole wall into which the dowel is inserted. FIG. 2 shows the expansion dowel of the present invention in a cross-sectional view extending perpendicularly to the dowel axis in the contact region between the inside surface 4 of the through bore and the envelope or outside surface 7 of the expanding member 6 retained in a captive manner in its initial position, while FIG. 3 is a similar cross-sectional view with the expanding member 6 in its end position and with the expansion tangs 3 widened. As can be noted in the drawing the inside surface 4 and the envelope surface 7 are smooth.

As is clearly shown in FIG. 2, the inside surfaces 4 of the expansion tangs 3 have a larger radius of curvature than the envelope surface 7 of the expanding element 6 adjacent. As a result, the envelope surface 7 of the expanding member 6, in its initial position, rests only at axially extending basically line shaped regions 8 at the inside surfaces 4 of the expansion tangs 3 within the through bore 9 spaced intermediate the slots 5. By moving or displacing the expanding member 6 axially in the through bore 9 by axially directed blows, the expansion tangs 3 are pressed outwardly against the borehole surface in which the dowel is inserted and the axially extending slots 5 are widened. As shown FIG. 3, the through bore 9, in its end position in the contact region between the inside surface 4 of the expansion tangs 3 and the envelope surface 7 of the expanding member 6 has a radius of curvature a where the inside surface is identical to that of the envelope surface 7 of the expanding member. In particular, however, the radii of curvature a of through bore 9 in the contact region are adapted across the entire axial extent of the expanding member 6 to the radius of curvature of the envelope surface 7 of the expanding member 6. The expanding member 6 can have a cylindrical shape, a conical shape or a spherical shape.

The radii of curvature a of the inside surfaces 4 of the expansion tangs are selected in such a way that the through bore 9 has a circular cross-section in the widened state, wherein the inside surfaces 4 of the expansion tangs 3 form sections of circular shape in axial projection.

The adaptation of the radii of curvature a of the inside surface 4 of the expansion tangs 3 to the radii of curvature of the envelope or outside surface 7 of the expanding member 6 is effected by calibration of the through bore 9 of the expansion sleeve 2 in the region of the intended end position of the expanding member by means of a hardened die. Such adaptation of the radii of curvature of the through bore 9, which in the course of expansion loses its circular cross-section can be used in expansion sleeves 2 which are fabricated by machining or cold forming. The expansion sleeve 2 is strain hardened in the expansion region which is advantageous during the later displacement of the expanding member 6, since the sleeve does not deform plastically in an easy manner.

Since the radii of curvature of the through bore of the expansion sleeve 3 and of the expanding member 6 in its end position are identical in the contact area, a line shaped contact between the expansion sleeve 3 and expanding member 6 is avoided. Area contact exists between the expansion sleeve and the expanding member during the displacement of the expanding member in the through bore. This results in low area pressures when the expansion sleeve is widened. The friction forces, which have to be overcome, are reduced and the required driving energy is also reduced compared to known expansion dowels.

Possibly existing coating can no longer be damaged because of the maintenance of low friction. The danger of cold welding of rust-free materials in the course of displacing the expanding member in the through bore of the expansion sleeve is reduced. This avoids the expanding member from being insufficiently displaced and the expansion sleeve from being incompletely expanded. Due to the expansion dowel of the present invention, the expansion sleeve does not need to be slightly deformed plastically as the expansion member is displaced and this facilitates the displacement of the expanding member.

While specific embodiments of the invention have been shown and described in detail to illustrate the inventive principles, it will be understood that the invention may be embodied otherwise without departing from such principles.

What is claimed is:

1. An expansion dowel comprises an axially extending expansion sleeve (2) having an axially extending through bore (9) an axially extending expansion region (3) with at least one axial slot (5) extending parallel to the axis of said through bore (9) and an axially extending inside surface (4) being smooth in the axial and circumferential directions, said at least one slot (5) having axially extending edges, means for receiving axially directed blows for expanding said expansion region for converting axially directed linear contact with said expansion region into axially and circumferentially directed area contact with said expansion region and for expanding said expansion region during transition from said axially directed linear contact into said area contact, said means comprising an expanding member (6) having an outside surface (7) being smooth in the axial and circumferential direction and being axially displaceable in said through bore (9) along said surface (4) by axially directed blows from an initial position to an end position for expanding said expansion region (3), in the initial position the edges of said slot are in circumferentially spaced relation, in the initial position said expanding member (6) having said outside surface (7) in substantially axially directed linear contact regions (8) with the inside surface (4) of said through bore (9) in the expansion region (3) so that said expanding member (6) is in spaced axially and circumferentially directed relation with respect to the inside surface (4) of said expansion region (3) outside said linear contact regions (8) and in the end position of said expanding member (6) said inside surface (4) of said through bore in the expansion region (3) which is adjacent to said outside surface (7) of said expanding member (6) being in area contact with said outside surface (7) in full circumferentially and axially extending regions of said expanding member (6) and said inside surface (4) of said expansion region (3), and said inside surface (4) having radii of curvature corresponding basically to radii of curvature of said outside surface (7) of said expanding member (6) whereby said expanding member effects expansion of said expansion sleeve as said expanding member is driven axially from the initial position to the end position with the edges of said slots being in increased spaced relation as compared to the initial position.

2. An expansion dowel, as set forth in claim 1, wherein said expansion region (3) has four axially extending expansion tangs (3) separated by said axially extending slots (5), said tangs (3) each having an inside surface (4) forming said through bore (9) and each having radii of curvature (a) in the end position in a contact region (4, 7) with said expanding member (6), and said expansion region with the expanding member (6) displaced into the end position with the inside surfaces (4) in the widened state forming sections of circular contour in axial projection.

3. An expansion dowel, as set forth in claim 1 or 2, wherein the radii of curvature (a) being constant in the contact region (4,7) of said expansion region (3) in the end position.

4. An expansion dowel, as set forth in claim 1 or 2, wherein in the expanded state of said expansion region (3), the radii of curvature decreases towards a leading end of the contact region (4, 7) of the expanding member and the expansion region.

5. An expansion dowel, as set forth in claim 1 or 2, wherein the radii of curvature (a) of the expansion region (3) in the contact region (4) are adapted to a spherical shape of said expanding member 6 in the end position.

6. An expansion dowel, as set forth in claim 1 or 2, wherein said axially directed linear contact region (8) is located in a trailing region of said inside surfaces (4) of said expansion region.

7. An expansion dowel, as set forth in claim 2, wherein the radii of curvature (a) of the inside surfaces (4) of said through bore in expansion region (3) adjacent to the outside surface (7) of said expanding member (6) in the initial position of the expanding member being formed by calibrating said through bore (9) with a hardened die.

* * * * *